(12) United States Patent
DiCesare

(10) Patent No.: US 9,694,413 B2
(45) Date of Patent: Jul. 4, 2017

(54) METHOD OF PRODUCING TAILORED TUBES

(75) Inventor: Giovanni DiCesare, London (CA)

(73) Assignee: Magna International Inc., Aurora, ON (CA)

( * ) Notice: Subject to any disclaimer, the term of this patent is extended or adjusted under 35 U.S.C. 154(b) by 974 days.

(21) Appl. No.: 13/256,841

(22) PCT Filed: Mar. 12, 2010

(86) PCT No.: PCT/CA2010/000370
§ 371 (c)(1),
(2), (4) Date: Sep. 26, 2013

(87) PCT Pub. No.: WO2010/105341
PCT Pub. Date: Sep. 23, 2010

(65) Prior Publication Data
US 2014/0068945 A1    Mar. 13, 2014

Related U.S. Application Data

(60) Provisional application No. 61/161,483, filed on Mar. 19, 2009.

(51) Int. Cl.
| | |
|---|---|
| *B21D 22/18* | (2006.01) |
| *B21D 47/01* | (2006.01) |
| *B21D 9/15* | (2006.01) |
| *B21D 26/033* | (2011.01) |
| *B21D 26/035* | (2011.01) |
| *B21D 35/00* | (2006.01) |
| *B62D 21/02* | (2006.01) |
| *B62D 25/00* | (2006.01) |

(52) U.S. Cl.
CPC .............. *B21D 47/01* (2013.01); *B21D 9/15* (2013.01); *B21D 22/18* (2013.01); *B21D 26/033* (2013.01); *B21D 26/035* (2013.01); *B21D 35/00* (2013.01); *B62D 21/02* (2013.01); *B62D 25/00* (2013.01); *Y10T 29/49622* (2015.01)

(58) Field of Classification Search
CPC ........ Y10T 29/49805; Y10T 29/49622; B21D 47/01; B21D 35/00; B21D 26/035; B21D 26/033; B21D 22/18; B21D 9/15; B21D 26/051; B21D 26/057; B62D 21/02; B62D 25/00
See application file for complete search history.

(56) References Cited

U.S. PATENT DOCUMENTS

| | | | |
|---|---|---|---|
| 2,907,102 A * | 10/1959 | Armstrong | B21D 9/03 29/890.149 |
| 3,583,188 A | 6/1971 | Nakamura | |
| 3,859,839 A | 1/1975 | Crotti | |

(Continued)

FOREIGN PATENT DOCUMENTS

WO    0197996 A1    12/2001

*Primary Examiner* — Sarang Afzali
*Assistant Examiner* — Ruth G Hidalgo-Hernandez
(74) *Attorney, Agent, or Firm* — Dickinson Wright PLLC

(57) ABSTRACT

A method of manufacturing a hollow structural frame rail includes rotating a tube relative to a tool to reduce an outside diameter of the tube at predetermined positions along the length of the tube. An elastomeric insert is positioned within the tube. The tube is bent at a location containing the insert. The bent tube is hydroformed to define a finished shape of the frame rail.

23 Claims, 5 Drawing Sheets

(56) References Cited

U.S. PATENT DOCUMENTS

| | | | |
|---|---|---|---|
| 4,481,803 A * | 11/1984 | Dieser | B21D 9/073 72/150 |
| 5,333,775 A * | 8/1994 | Bruggemann | B21C 37/06 228/155 |
| 5,398,533 A * | 3/1995 | Shimanovski | B21D 26/045 29/421.1 |
| 5,823,031 A | 10/1998 | Campbell et al. | |
| 6,183,013 B1 | 2/2001 | MacKenzie et al. | |
| 6,513,243 B1 * | 2/2003 | Bignucolo | B21D 26/033 29/421.1 |
| 6,613,164 B2 | 9/2003 | Dykstra et al. | |
| 7,143,618 B2 * | 12/2006 | Ni | B21D 9/073 72/369 |
| 7,269,986 B2 | 9/2007 | Pfaffmann et al. | |
| 2006/0123875 A1 | 6/2006 | Oxley et al. | |
| 2008/0053183 A1 | 3/2008 | Dickson et al. | |

\* cited by examiner

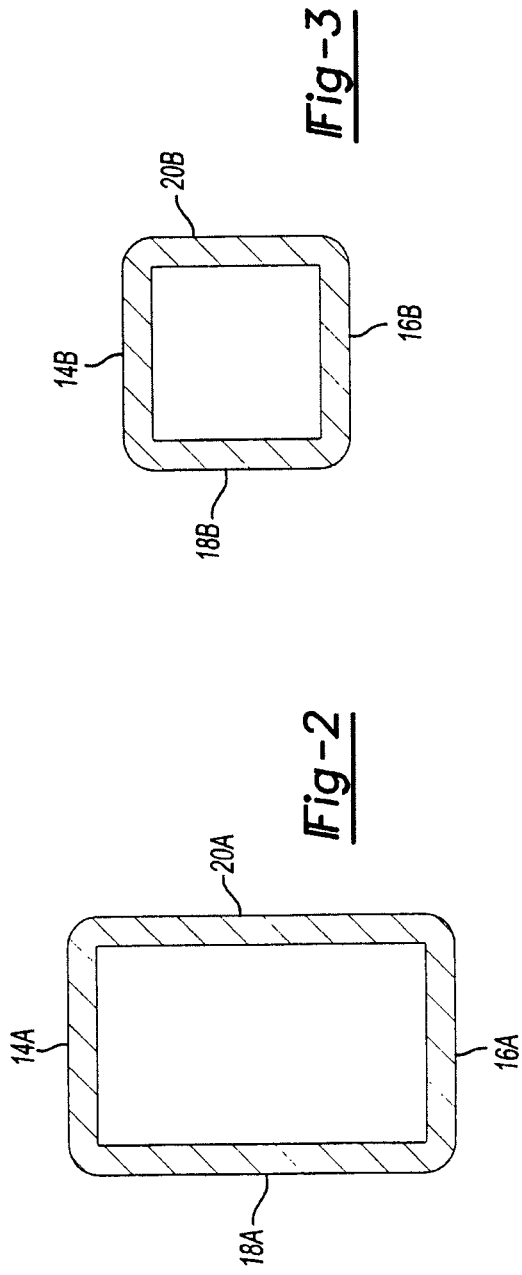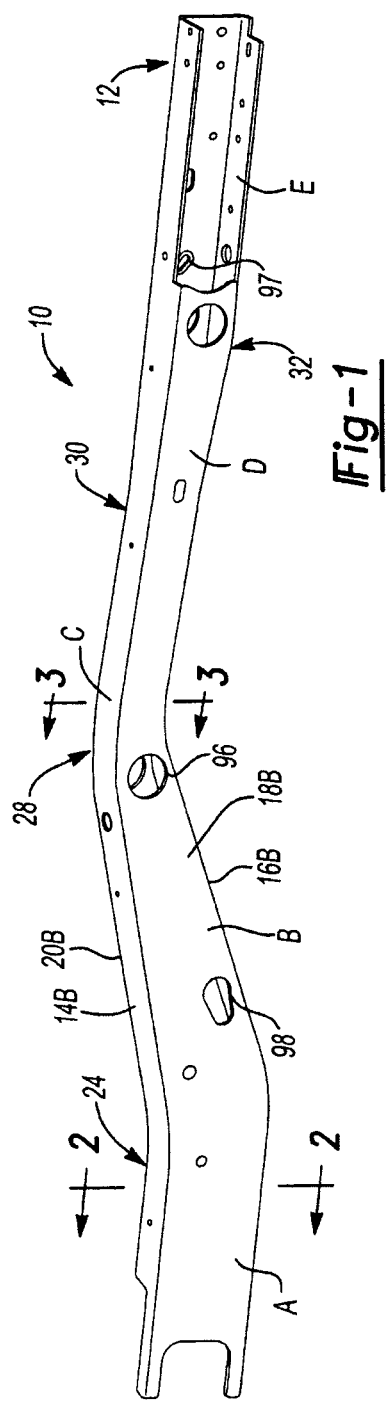

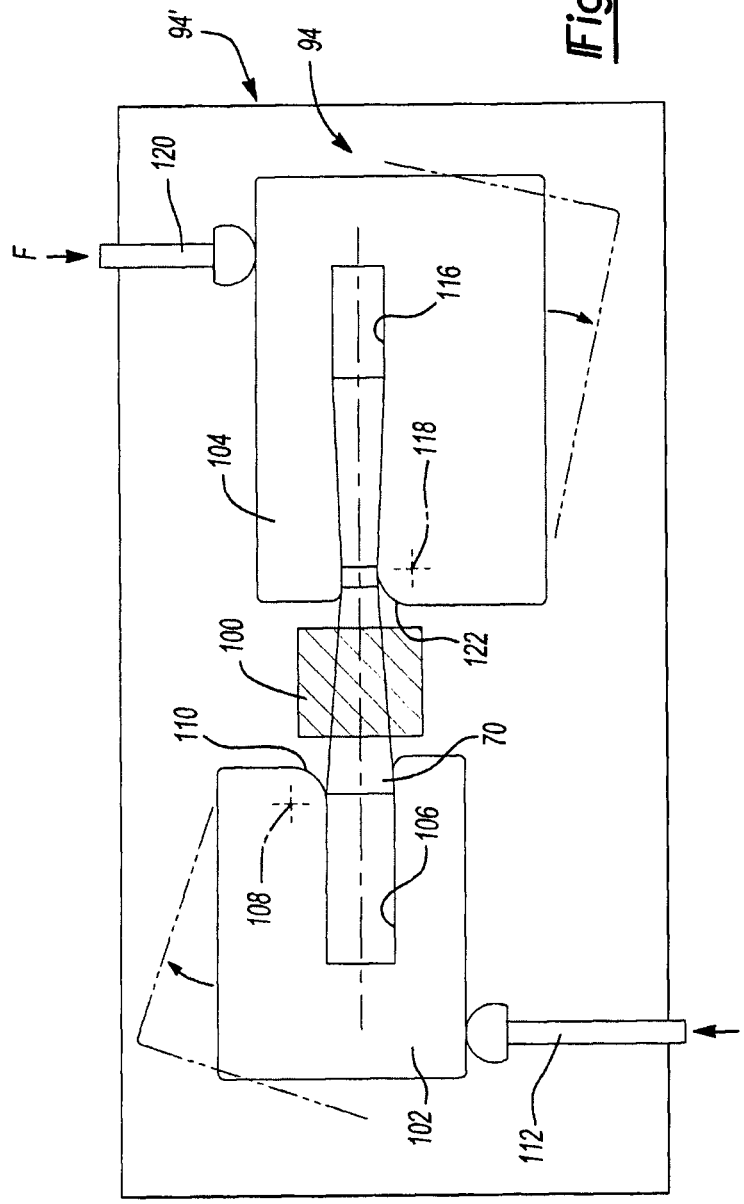
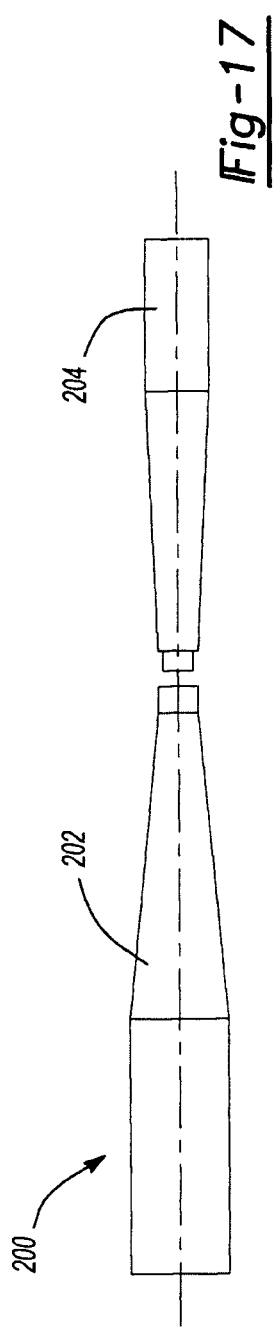

METHOD OF PRODUCING TAILORED TUBES

CROSS REFERENCE TO RELATED APPLICATIONS

This patent application claims the benefit of International Application No. PCT/CA2010/000370 filed Mar. 12, 2010 entitled "Method Of Producing Tailored Tubes" and U.S. Provisional Application Ser. No. 61/161,483 filed Mar. 19, 2009, the entire disclosures of the applications being considered part of the disclosure of this application, and hereby incorporated by reference.

FIELD OF THE INVENTION

The present disclosure relates to a method of forming a tubular structural member for a vehicle. More particularly, a method of producing a hollow metal tube having certain portions expanded sixty percent more than other portions of the same tube is described.

BACKGROUND OF THE INVENTION

This section provides background information related to the present disclosure which is not necessarily prior art.

Due to ever increasing concerns relating to vehicle fuel efficiency, increased efforts are being expended to reduce the overall weight of a vehicle. Improved vehicle handling and stability are also desired in combination with the reduction in weight.

Some vehicle manufacturers have successfully constructed a number of vehicle structural components from lighter weight materials including magnesium or aluminum alloys. Carbon fiber and reinforced plastic panels have also been incorporated within the vehicle design. This approach, however, may not be possible for certain applications where the component is subjected to substantial mechanical loading. Examples of such components may include vehicle frame members, suspension components, and axle housings.

Some vehicle frame members are constructed from "C"-shaped channels welded to one another. The channels are constructed from a relatively low carbon steel. Several brackets, gussets, flanges, and cross-members may be attached to the vehicle frame rail to provide attachment points for various vehicle body and suspension components that are not exactly aligned with the longitudinally extending frame rails.

Attempts have been made to hydroform hollow steel tubes to produce vehicle frame rails. While some of these attempts have been successful, limits on the amount of expansion that may be obtained by hydroforming exist. Some manufacturers have added additional procedural steps and off-line machines to bend, crush or otherwise deform a portion of the frame rail. While these additional sets of tools and process steps may more closely define a frame rail to a desired shape, the costs associated with these manufacturing techniques may be exorbitant. Accordingly, a need exists in the art to provide a manufacturing process for cost efficiently providing a reduced weight structural member having relatively complex geometry.

SUMMARY OF THE INVENTION

This section provides a general summary of the disclosure, and is not a comprehensive disclosure of its full scope or all of its features.

A method of manufacturing a hollow structural frame rail includes rotating a tube relative to a tool to reduce an outside diameter of the tube at predetermined positions along the length of the tube. An elastomeric insert is positioned within the tube. The tube is bent at a location containing the insert. The bent tube is hydroformed to define a finished shape of the frame rail.

The present disclosure also relates to a method of manufacturing a hollow structural frame rail including obtaining a tube having a substantially circular cylindrical outer surface. The tube is rotated and circumferentially spaced apart rollers are engaged with the outer surface to reduce an outside diameter of the tube at predetermined positions along the length of the tube. An elastomeric insert is positioned within the tube. The tube is bent at a location containing the insert. The bent tube is hydroformed to define a finished shape of the frame rail.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIG. 1 is a perspective view of an exemplary frame rail constructed by a method of the present disclosure;

FIG. 2 is a cross-sectional view of the frame rail taken at the intersection portion A and portion B;

FIG. 3 is a cross-sectional view of the frame rail taken at the intersection between portion B and portion C;

FIG. 16 is a schematic of a bending machine as well as a bending and hydroforming machine; and FIG. 17 is a side view of an alternate tapered tube assembly.

Corresponding reference numerals indicate corresponding parts throughout the several views of the drawings.

DETAILED DESCRIPTION OF THE INVENTION

Figure 4:
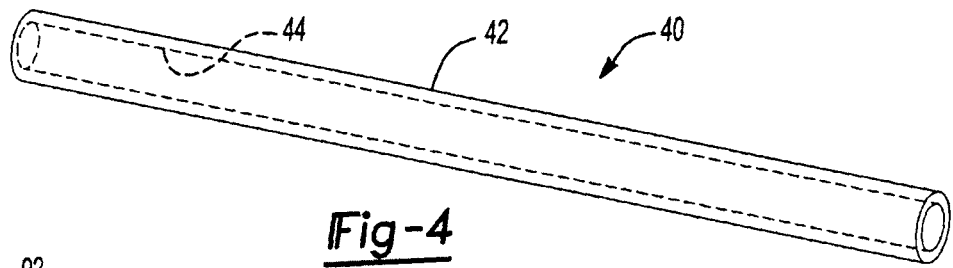
FIG. 4 is a perspective view of a tube.
Figure 5:
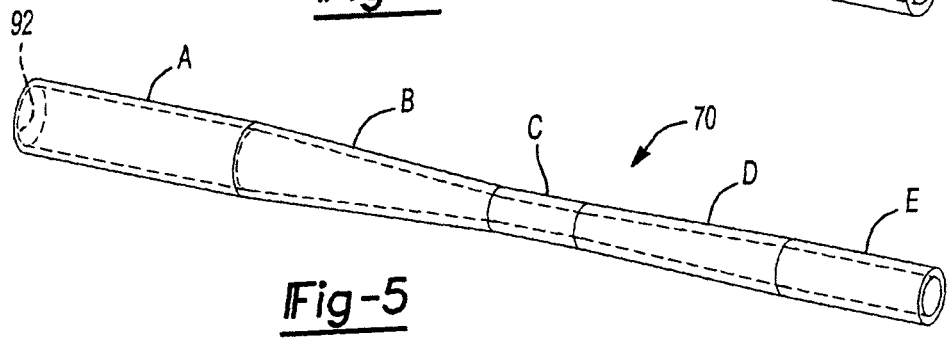
FIG. 5 is a perspective view of a work-in-process tapered tube.

Example embodiments will now be described more fully with reference to the accompanying drawings.

With reference to FIGS. 1-2, an exemplary frame rail constructed by a method of the present disclosure is identified at reference numeral 10. Frame rail 10 includes a monolithic tube 12 having differently sized and shaped first through fifth portions A, B, C, D, and E, respectively. Each portion of frame rail 10 includes a top wall 14 and a bottom wall 16 interconnected by first and second side walls 18, 20, respectively. The Figures depict each of the walls having a suffix letter corresponding to one of the first through fifth portions. For example, first portion A has a substantially rectangular cross-sectional shape including top wall 14A and bottom wall 16A having substantial equal lengths and extending substantially parallel to one another. First side wall 18A has substantially the same size as second side wall 20A. The first and second side walls 18A, 20A extend substantially parallel to one another. For reference purposes, the perimeter of first portion A is defined as a distance P.

Second portion B has a first end 24 seamlessly joined to first portion A. First end 24 has substantially the same cross-sectional shape as first portion A. Second portion B includes a second end 28 having a substantially rectangular cross-section. As shown in FIG. 3, the outer perimeter of portion B at second end 28 is reduced to approximately 0.63 P. Top wall 14B and bottom wall 16B are substantially the same size as top wall 14A and bottom wall 16A. The reduction in perimeter is accomplished by reducing the height of first side wall 18B and second side wall 20B. In the example depicted in the Figures, first side wall 18B and second side wall 20B taper substantially the same amount from first end 24 to second end 28. It should also be appreciated that second portion B extends at an angle relative to first portion A.

Third portion C has a substantially constant rectangular cross-sectional shape having an outer perimeter of approximately 0.37 P. Third portion C extends at an angle relative to second portion B.

Fourth portion D is a tapered portion similar to portion B in that top wall 14D and bottom wall 16D are substantially the same size as the top and bottom walls 14, 16 of portions A, B, and C. First side wall 18D and second side wall 20D taper from a first end 30 to a second end 32. At second end 32, the perimeter of portion D is approximately 0.72 P. Fourth portion D may extend at an angle relative to third portion C as the final design of frame rail 10 requires.

Fifth portion E has the cross-sectional size and shape of second end 32 of fourth portion D. The cross-sectional shape of fifth portion E is substantially constant along its length. The perimeter of portion E is approximately 0.72P. Based on the above description, it should be appreciated that portion A has an approximate 60% expansion when compared to portion C. Similarly, portion E exhibits approximate 15% expansion when compared to portion C.

With reference to FIGS. 4-8, a method of producing frame rail 10 includes beginning with a work-in-process component or tube 40 having an outer surface 42 with a substantially circular cylindrical shape. An inner surface 44 of tube 40 also has a substantially circular cylindrical shape. Tube 40 is rotatably mounted within a machine such as a lathe 46 depicted in FIG. 9. A first end 48 of tube 40 is temporarily drivingly mounted to a spindle 50 of lathe 46. Spindle 50 is driven by a motor 52. A second end 54 of tube 40 is rotatably supported by a tail stock 56. By energizing motor 52, tube 40 may be rotated relative to a tool 58.

Figure 10:
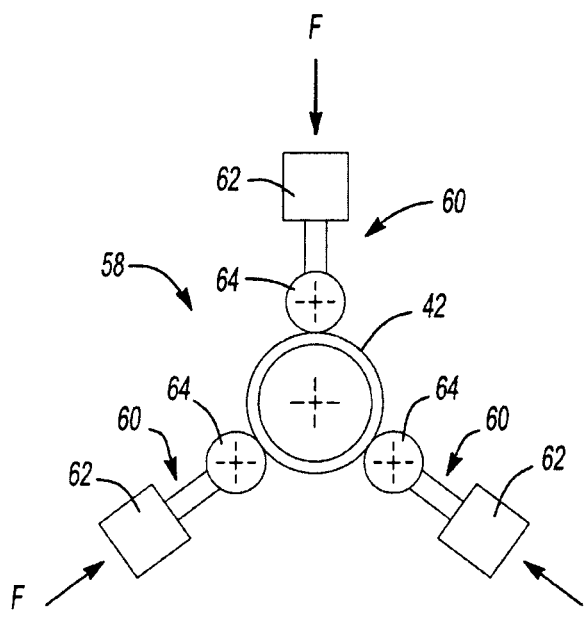
FIG. 10 is a schematic depicting actuator roller assemblies for reducing the diameter of the tube.

As shown in FIG. 10, tool 58 may include three circumferentially spaced apart pressure roller assemblies 60. Each pressure roller assembly 60 includes an actuator 62 operable to radially translate a roller 64 into and out of contact with outer surface 42 of tube 40. The set of pressure roller assemblies 60 are also longitudinally moveable parallel to an axis of rotation 66 of tube 40. By varying the force applied to each roller 64 in concert with the longitudinal position of the set of pressure roller assemblies 60, outer surface 42 may be shaped. Once the pressure assemblies are no longer engaged with outer surface 42, an intermediate level work-in-process tapered tube 70 is defined. Tapered tube 70 includes portions A, B, C, D and E but the outer shape of each portion is either substantially cylindrical or frustoconical. Other shapes may also be defined. Furthermore, the outer surface of each portion is aligned along the common axis of rotation 66. Tapered tube 70 is now removed from lathe 46.

Figure 13:
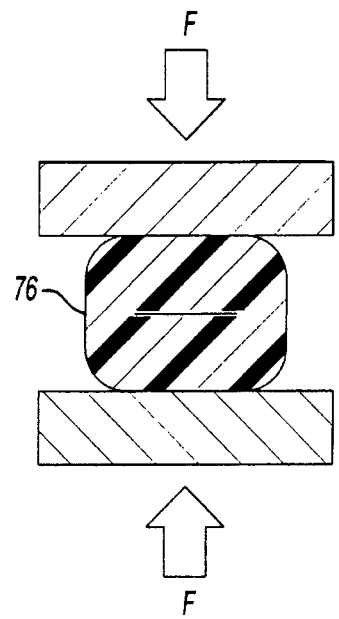
FIG. 13 is a cross-sectional view of a portion of the insert in a deformed state.

One or more inserts 74, depicted in FIGS. 11-15, may be positioned within tapered tube 70 at predetermined axial locations. Insert 74 is preferably constructed from an elastomeric material such as urethane or rubber. Insert 74 functions to restrict buckling, creasing or kinking of a localized portion of tapered tube 70 during a subsequent bending process. Insert 74 will likely have an outer surface 76 shaped to compliment at least a portion of the shape of inner surface 44. In a first configuration shown in FIGS. 11 and 12, insert 74 includes an axially extending aperture 78 formed in the shape of an elongated slot. The shape of aperture 78 may be varied to maintain a desired shape of inner surface 44 and outer surface 42 after the bending process. FIG. 13 depicts the shape of insert 74 after a compressive load has been applied.

Figure 14:
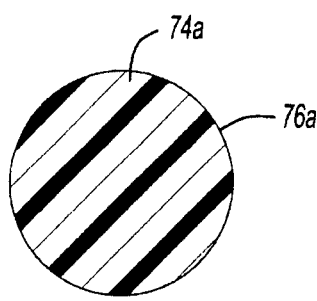
FIG. 14 is a cross-sectional view of an alternate insert in an undeformed state.
Figure 15:
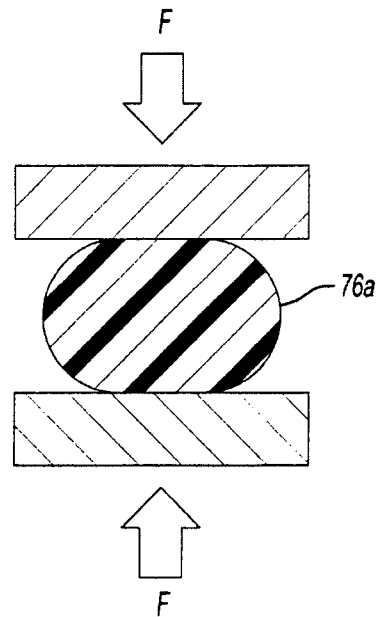
FIG. 15 is a cross-sectional view of the alternate insert in a deformed state.

An alternate insert 74a is shown in FIG. 14 as a solid, cylindrically-shaped member. When a compressive force is applied to an outer surface 76a of insert 74a, the shape of the deformed outer surface 76a, as shown in FIG. 15, is different than the shape of deformed outer surface 76. Based on this characteristic behavior, specifically tailored cross-sectional shapes may be defined within portions of the workpiece. For example, use of insert 74 having elongated aperture 78 assures that the cross-sectional shape at a bend will be substantially rectangular.

Figure 11:
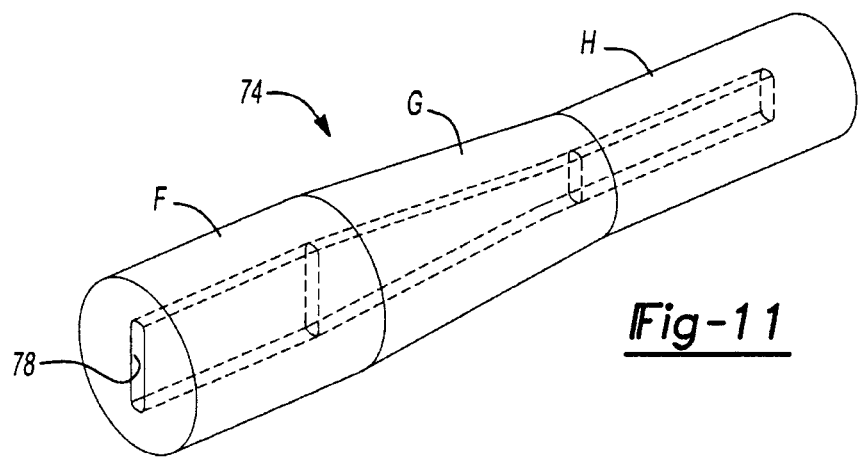
FIG. 11 is a perspective view of an insert positioned within the tube prior to bending.
Figure 12:
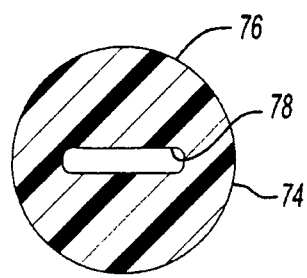
FIG. 12 is a cross-sectional view of the insert in an undeformed state.

FIG. 11 depicts insert 74 having three portions F, G, H that are sized and shaped to closely match the shape of internal surface 44 of tapered tube 70. Accordingly, a first portion F includes the largest outer diameter. Second portion G has a tapered outer surface. Third portion H has a reduced diameter substantially cylindrical surface. Insert 74 may enter an aperture 92 formed at the end of tapered tube 70 including first portion A. The smallest diameter third portion H of insert 74 enters aperture 92 first. Insert 74 is axially translated until second tapered portion G engages inner surface 44 within tapered portion B of tapered tube 70.

The process of producing frame rail 10 continues by placing the subassembly of tapered tube 70 and insert 74 within a tube bending machine 94 or a combination tube bending and hydroforming machine 94' as shown in FIG. 16. Combination bending and hydroforming machine 94' will be described in greater detail at a later point in this paper.

Bending machine 94 includes a clamp 100 operable to restrain tapered tube 70 from movement at a particular location. In the example depicted in FIG. 16, clamp 100 engages an outer surface of second portion B. Bending machine 94 also includes a first rotatable die 102 and a second rotatable die 104. First die 102 includes a cavity 106 sized and shaped to complement the size and shape of outer surface 42 of tapered tube 70 at first portion A. First die 102 is rotatable about an axis 108. A first cam surface 110 is formed on first die 102. First cam surface 110 is engageable with outer surface 42. A first actuator 112 applies a force to rotate first die 102 and bend tapered tube 70.

Second rotatable die 104 includes a cavity 116 sized and shaped to complement outer surface 42 of tapered tube 70 at portions C, D, and E. Second rotatable die 104 is rotatable about an axis 118. A second actuator 120 provides a force to move rotatable die 104 and bend tapered tube 70. A second cam face 122 is formed on second rotatable die 104 and is selectively engageable with outer surface 42. It should be appreciated that in the example depicted, third portion H of insert 74 is elongated to extend beyond third portion C and at least partially enter fourth tapered portion D. As such, only one insert 74 is required to produce the particular frame rail 10 shown in the Figures. As previously noted, additional inserts may be positioned within tapered tube 70 if the geometry of the tapers and the position of the desired bends so dictate.

Figure 6:
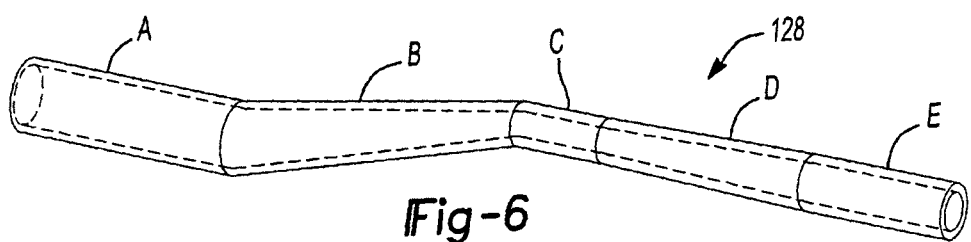
FIG. 6 is a perspective view of a work-in-process bent and tapered tube.
Figure 7:
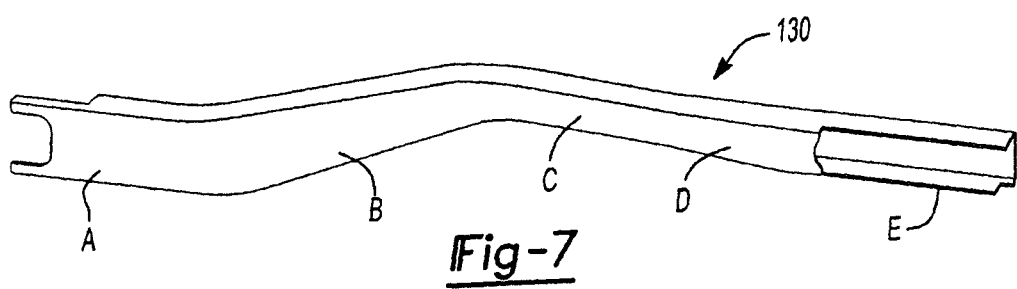
FIG. 7 is a perspective view of a work-in-process hydroformed tube.
Figure 8:
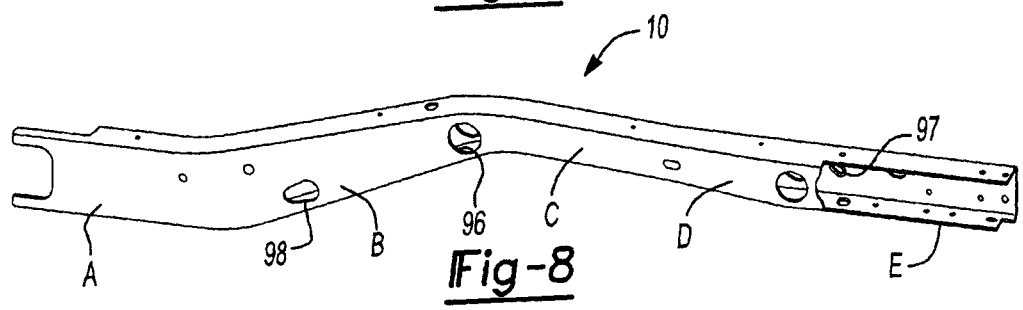
FIG. 8 is a perspective view of a hydroformed and hydropierced tube.
Figure 9:
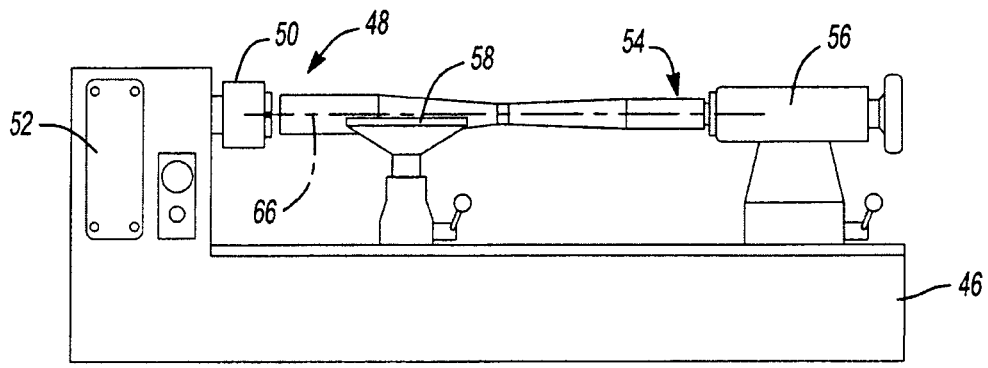
FIG. 9 is a schematic depicting a tool for rotating the tube and reducing its outer diameter.

If bending machine 94 is provided separately from a hydroforming machine, a bent and tapered work-in-process tube 128, shown in FIG. 6, may be removed from bending machine 94 and positioned within a hydroforming apparatus. During hydroforming, pressurized fluid acts on inner surface 44 to radially outwardly expand outer surface 42 into contact with die surfaces of the hydroforming machine. It is contemplated that 80-90 percent of the finished part shape is defined after completing the bending operation. The hydroforming operation qualifies exterior surface 42 and causes bent and tapered tube 128 to expand approximately 2-4 percent to place the tube in final form thereby defining a work-in-process rail 130 as depicted in FIG. 7. A hydropiercing operation may also be performed at this time if additional features such as apertures 96, 97 and 98, shown in FIG. 8, are desired. Completed frame rail 10 may now be removed from the hydroforming and hydropiercing die.

As previously mentioned, it is contemplated that a combination bending, hydroforming and hydropiercing apparatus be used in lieu of two separate machines as previously described. In particular, it is contemplated that combination bending and hydroforming machine 94' performs each of the previously described bending and hydro processes without the need for physical transfer of work-in-process bent and tapered tube 128 between a bending machine and a hydroforming machine.

Another alternate process step may include induction heating bent and tapered tube 128 after the bending operation has been performed to introduce formability back into the tube. This step may be desired if the tube has been sufficiently work hardened during the bending process to preclude proper hydroforming and hydropiercing.

In an alternate form shown in FIG. 17, a multi-piece frame rail 200 may be formed by fixing a first work-in-process tapered tube 202 to a second work-in-process tapered tube 204. The tubes may be coupled to one another by any one of several known processes including mig welding, laser welding, mechanical fastening, adhesive bonding, and the like. The remaining process steps previously described may be performed on tapered tube assembly 200.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A method of manufacturing a hollow structural frame rail, comprising:
reducing an outside diameter and an inside diameter of a tube at predetermined positions along the length of the tube, the tube having an inner surface providing the inside diameter;
the reducing step including reducing the inside diameter of a first portion of the tube more than the inside diameter of a second portion of the tube;
positioning an elastomeric insert within the tube after reducing the diameters of the tube, the elastomeric insert having an outer surface which matches and engages the inner surface of the tube along the first portion and the second portion;
bending the tube at a location containing the elastomeric insert;
and hydroforming the bent tube to define a finished shape of the frame rail.

2. The method of claim 1 further including clamping the tube to restrict movement of a portion of the tube during the bending.

3. The method of claim 2 further including applying a force to a first end of the tube to rotate the first end of the tube relative to a clamp.

4. The method of claim 3 further including engaging an outer surface of the tube with a cam surface to define a shape of the outer surface of the tube during the bending.

5. The method of claim 4 wherein the cam surface is formed on a rotatable die in receipt of the first end of the tube.

6. The method of claim 3 further including applying a force to another portion of the tube spaced apart from the first end of the tube to rotate the another portion of the tube relative to the clamp.

7. The method of claim 1 further including piercing apertures through the tube while the tube is positioned within a hydroforming die used to perform the hydroforming.

8. The method of claim 1 wherein the bending is performed in a tool, and the hydroforming is performed in the tool.

9. The method of claim 1, wherein the bending is performed in a tool, and further including hydropiercing the tube within the tool.

10. The method of claim 1, wherein the tube is a first tube, and further including reducing an outside diameter and an inside diameter of a second tube at predetermined positions along a length of the second tube and fixing an end of the first tube to an end of the second tube and subsequently performing the bending and hydroforming.

11. A method of manufacturing a hollow structural frame rail, comprising:
obtaining a tube having a substantially circular cylindrical outer surface;
rotating the tube;
reducing an outside diameter and an inside diameter of the tube at predetermined positions along a length of the tube by engaging circumferentially spaced apart rollers with the outer surface of the tube, the tube having an inner surface providing the inside diameter;
the reducing step including reducing the inside diameter of a first portion of the tube more than the inside diameter of a second portion of the tube;
positioning an elastomeric insert within the tube after reducing the diameters of the tube, the elastomeric insert having an outer surface which matches and engages the inner surface of the tube along the first portion and the second portion;

bending the tube at a location containing the elastomeric insert; and hydroforming the bent tube to define a finished shape of the frame rail.

12. The method of claim 11 further including clamping the tube to restrict movement of a portion of the tube during the bending.

13. The method of claim 12 further including applying a force to a first end of the tube to rotate the first end of the tube relative to a clamp.

14. The method of claim 13 further including engaging an outer surface of the tube with a cam surface to define a shape of the outer surface of the tube during the bending.

15. The method of claim 14 wherein the cam surface is formed on a rotatable die in receipt of the first end of the tube.

16. The method of claim 11 further including translating the rollers substantially parallel to a tube axis of rotation while radially moving the rollers toward the tube axis of rotation.

17. The method of claim 16 further including forming a shaped aperture within the elastomeric insert to vary an outer shape the elastomeric insert forms upon application of an external load.

18. The method of claim 1, wherein the outer surface of the elastomeric insert includes sections of different diameters along a length of the tube to complement at least the inside diameter of the first portion of the tube and the inside diameter of the second portion of the tube before the bending of the tube.

19. The method of claim 18, wherein the elastomeric insert is a single piece of elastomeric material.

20. The method of claim 11, wherein the outer surface of the elastomeric insert includes sections of different diameters along a length of the tube to complement at least the inside diameter of the first portion of the tube and the inside diameter of the second portion of the tube before the bending of the tube.

21. The method of claim 20, wherein the elastomeric insert is a single piece of elastomeric material.

22. The method of claim 11 wherein the bending is performed in a tool, and the hydroforming is performed in the tool.

23. The method of claim 11, wherein the tube is a first tube, and further including rotating a second tube and engaging circumferentially spaced apart rollers with an outer surface of the second tube to reduce an outside diameter and an inside diameter of the second tube at predetermined positions along a length of the second tube and fixing an end of the second tube to an end of the first tube and subsequently performing the bending and the hydroforming.

* * * * *